Figure 2:
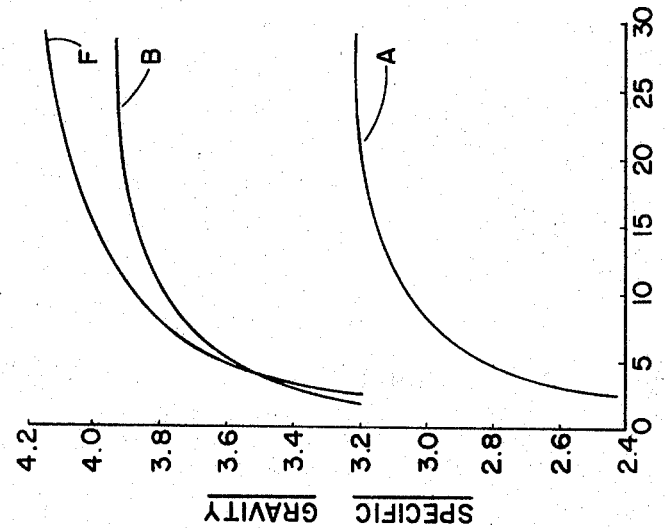

Jan. 10, 1967　　　　L. B. ANTHES　　　　3,297,158

HEAVY MEDIUM SEPARATION MEDIA AND PROCESS

Filed Dec. 30, 1963

INVENTOR.
LESTER B. ANTHES
BY
ATTORNEY

United States Patent Office 3,297,158
Patented Jan. 10, 1967

3,297,158
HEAVY MEDIUM SEPARATION MEDIA
AND PROCESS
Lester B. Anthes, Niagara Falls, Ontario, Canada, assignor to The Carborundum Company, Niagara Falls, N.Y., a corporation of Delaware
Filed Dec. 30, 1963, Ser. No. 334,259
4 Claims. (Cl. 209—172.5)

The invention of the present application relates to separation media of the type used in sink-float processes. It is particularly concerned with the preparation of novel separation media and solid constituents thereof and with processes for producing and using such media.

In recent years there has developed considerable interest and activity with respect to gravity separation processes for ores and the like in which the heavy medium used for separating the relatively light and heavy portions of a feed material comprises a liquid suspension of particles of a solid of high specific gravity. The liquid constituent of the suspension is usually water and among the most useful and widely used materials employed as the solid constituent of such media is ferrosilicon.

Preferably the ferrosilicon used in separation media has a silicon content ranging between about 11 percent and 22 percent by weight, since within that range of composition the ferrosilicon has a high magnetic susceptibility and a relatively high resistance to corrosion and rusting. Thus the solid constituent of the separation medium may be easily recovered by magnetic means and there is not only little, if any, contamination of the products by corrosion products but also substantially no loss of the ferrosilicon by corrosion. The ferrosilicon may and often will contain up to about 10 percent of other metals as minor constituents since there is no particular advantage to highly pure alloys. As an example of a ferrosilicon product that is quite satisfactory is one which showed on analysis: Fe, 77 percent; Si, 15 percent; Al, 2 percent; Ti, 4 percent; other, 2 percent. Another useful material for use as the solid constituent of suspension media is the mineral magnetite which like ferrosilicon can be readily recovered by magnetic means.

It is an object of the present invention to provide novel and improved separation media in which a particulate material having high magnetic susceptibility is the solid constituent.

More specifically it is an object of the invention to provide a particulate ferrosilicon product with which separation media of very high specific gravity and very low consistency may be prepared.

Another object of the invention is to provide a ferrosilicon product of novel shape characteristics which is particularly suitable for use in separation media.

Still another object of the present invention is to provide improved separation processes that utilize ferrosilicon separation media of the character described.

Another object of the invention is to provide a process for producing particulate materials having shape characteristics that make possible separation media having very high densities and very low consistency.

Figure 1:
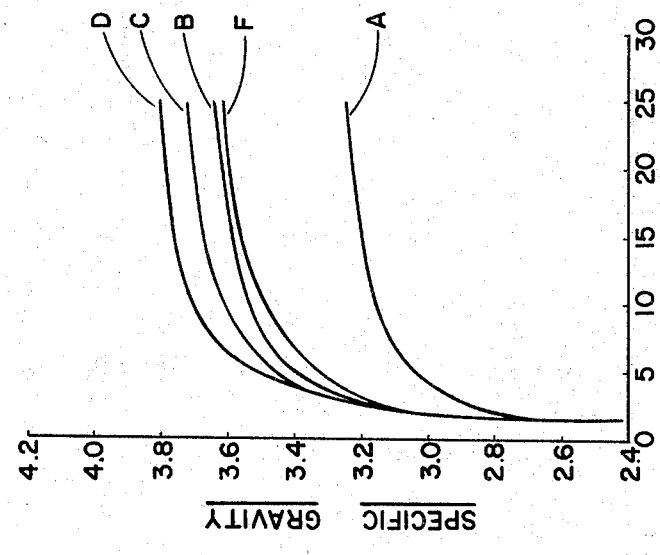

Other objects and advantages of the present invention will be apparent from the following description thereof, taken in conjunction with the accompanying drawings in which:

FIGURES 1 and 2 are graphical comparisons of the consistency-specific gravity relationship of novel separation media according to the present invention and previously known media.

Heretofore in separation media for use with such heavy feed materials as metallic ores, ferrosilicon has generally been employed as the solid constituent along with water as the liquid constituent. The specific gravity of such a separation medium is adjusted as necessary to produce proper separation with a specific ore by increasing or decreasing the amount of ferrosilicon used, i.e., by changing the ratio of ferrosilicon to water. Ordinary milled ferrosilicon has been limited in usefulness by the rapidly increasing viscosity of the media in the higher ranges of specific gravity. This viscosity increase hinders settling of the heavier portions of the feed and slows down the separation. For some time there has been available ferrosilicon atomized from the molten state to form substantially globular particles having smooth, fused surfaces. This product has operated successfully in separation media but is rather expensive. Moreover, the attainment of very high specific gravities in suspensions that contain substantial proportions of the larger atomized ferrosilicon particles is difficult because these larger particles tend to be porous or hollow and thus have a low bulk density.

Unexpectedly it has been found possible to prepare, inexpensively and without atomization, granular ferrosilicon that not only has a high bulk density but, when mixed with water, also produces suspension media with low viscosities. This result is obtained by subjecting standard, graded, crushed ferrosilicon products to a mulling procedure for a short time.

The resulting novel products have been carefully tested and it has been found that bulk densities in the same range as those of the previously known, atomized ferrosilicon can be easily obtained. It has also been found that in water suspension the novel, rough-surfaced, mulled ferrosilicon products of the present invention have a relation of suspension viscosity or consistency to suspension specific gravity that is very close to that of suspensions of the smooth, atomized ferrosilicon.

In the following example there is set forth a preferred procedure for producing a novel ferrosilicon product useful for the solid constituent of a separation medium.

EXAMPLE 1

A batch of 2700 lbs. of ground ferrosilicon particles was placed in the pan of a large pan mill and mulled with a heavy roller which was repeatedly passed over the particles. After 15 minutes of mulling a sample was removed for test. Additional test samples were thereafter removed on the completion of 30 and 60 minutes of mulling. Each of these samples, as well as a sample of the unmulled granular ferrosilicon, was independently screened to obtain a separation of particles of different sizes. Controlled particle size samples corresponding to the original samples were then made up by combining for each sample particles of different sizes in such proportions as to obtain in each case a screen analysis as follows: on 65 mesh, 2.0 percent; on 100 mesh, 15.1 percent; on 150 mesh, 15.1 percent; on 200 mesh, 25.2 percent; on 325 mesh, 29.6 percent; through 325 mesh, 13.0 percent. The bulk densities of these controlled particle size samples were then determined. These are set forth in the following table.

TABLE A

| Sample | Time of Mulling, minutes | Bulk Density, g./cc. |
|---|---|---|
|  | 0 | 3.042 |
|  | 15 | 3.572 |
|  | 30 | 3.632 |
|  | 60 | 3.684 |

Separation media prepared by forming suspensions in water of a number of granular ferrosilicon samples were tested to determine their consistencies at various specific gravities. FIGURE 1 of the drawings shows the relation between the consistency in centipoises and the specific gravity of water suspensions of the controlled particle size samples listed in Table A as determined at 25° C. with apparatus of the type described in Bureau of Mines Report of Investigations 3469-R, dated May 1940. The curves marked A, B, C, and D are those representing the correspondingly identified samples. The curve marked F is shown for comparison and represents the consistency—specific gravity relation of a water suspension of the atomized, fused ferrosilicon product referred to above. The sample of this product tested was adjusted in particle size to have the same screen analysis as samples A, B, C, and D. It will be seen that the media formed from sample F is only slightly lower in specific gravity than the media using mulled samples B, C, and D at consistencies of from 2 to 25 centipoises while with sample A (unmulled) the consistency of the media increases so rapidly with increasing specific gravity that the suspensions with higher gravities are not feasible for use.

FIGURE 2 of the drawings sets forth a set of curves similar to those of FIGURE 1 which show the relation at 25° C. of specific gravity to consistency in centipoises of aqueous suspensions of three additional samples of particulate ferrosilicon, as determined on apparatus of the type mentioned above. In each sample, the ferrosilicon had a screen analysis of: on 48 mesh, 0.0 percent; on 65 mesh, 1.8 percent; on 100 mesh, 7.8 percent; on 150 mesh, 8.2 percent; on 200 mesh, 10.5 percent; on 325 mesh, 18.3 percent; through 325 mesh, 53.4 percent. The curve marked A shows the results of tests on separation media formed with regular, granular, unmulled ferrosilicon. The curve marked B shows that the consistency at high specific gravities of suspensions of granular ferrosilicon mulled for 105 minutes is much improved. The curve marked F shows corresponding results with aqueous suspensions of used, atomized ferrosilicon particles. It will be noted that in these tests, where the granular ferrosilicon employed has a considerably increased percentage of fine particles, there is little difference between curves B and F but that both show a great improvement over the regular product represented by curve A. For example, at a consistency of 15 centipoises a specific gravity of about 3.9 can be obtained with suspensions of both the mulled product and the fused, atomized product. On the other hand with separation media formed from ordinary ground ferrosilicon to obtain a specific gravity of even 3.2 necessitates reaching a viscosity of 20 or more centipoises.

It will be apparent from the foregoing that mulling for even a few minutes is effective in increasing the bulk density of the granular ferrosilicon and decreasing the consistency of separation media made therewith. As shown, continued mulling causes further improvement. However, the improvement is achieved at increasingly lower rates and it is therefore not usually feasible to employ a mulling time of over one hour.

The effect of the mulling is to break down the sharper particles of ferrosilicon thereby increasing the percentage of particles with blocky shapes. This is shown by the fact that the average length-width axial ratios of particles of granular ferrosilicon are much less after mulling than before. This is set forth in the following table.

TABLE B

| Material | Avg. Length, microns | Avg. Width, microns | Axial Ratio, Length:Width |
|---|---|---|---|
| Unmulled | 166 | 78 | 2.10:1 |
| Mulled (15 min.) | 147 | 79 | 1.86:1 |
| Mulled (60 min.) | 142 | 78 | 1.83:1 |

To reduce the variable factors the determinations in Table B were made on the fractions of the materials that passed a 170 mesh screen and were held on a 200 mesh screen. It will be observed in the table that the average particle width is essentially the same in all cases while the average particle length is materially reduced in the mulled samples. It is evident, therefore that the fines are not increased unduly by mulling. This is substantiated by other tests in which it was found that after 60 minutes mulling a product having originally 24.2 percent passing a 325 mesh screen had only 36.1 percent of the mulled product passing a 325 mesh screen. It has been found that mulled ferrosilicon with an average axial ratio of not more than about 1.9:1 and a bulk density of at least 3.5 g./cc. is very satisfactory (other factors being alike) as the solid ingredient of suspension media.

It will be apparent that by the present invention there is provided a novel, inexpensive, but quite useful solid constituent for separation media and improved separation procedures. While the procedure set forth above is preferred for preparing such solid constituents other methods of achieving the desired properties and characteristics may in some instances be employed.

Unless otherwise indicated percentages specified herein are percentages by weight. The sieves or screens used were U.S. standard sieves.

I claim:

1. A suspension medium which consists essentially of water and particles of ferrosilicon, said particles being solid and dense and having a rough, unfused surface, said ferrosilicon having a bulk density of at least 3.5 g./cc. and said medium having at a consistency of 15 centipoises, a specific gravity greater than 3.3.

2. A suspension medium as set forth in claim 1 which has a specific gravity in the range from about 3.5–3.9 g./cc.

3. A suspension medium as set forth in claim 1 in which the ratio of average particle length to average particle width is not more than about 1.9.

4. A process for separating a mixture of solids of different specific gravities into a light fraction and a heavy fraction which comprises forming a bath of a fluid separation medium, said medium consisting essentially of water and particles of ferrosilicon that are solid and dense and are characterized by a rough, unfused surface, said ferrosilicon having a bulk density of at least 3.5 g./cc., and said medium having at a consistency of 15 centipoises, a specific gravity of about 3.5–3.9, introducing said mixture onto said medium, separating the said light fraction together with a small amount of medium and subsequently separating said heavy fraction from the remainder of said medium.

References Cited by the Examiner

UNITED STATES PATENTS

| Re. 22,191 | 9/1942 | Wade | 209—39 |
| 1,110,222 | 9/1914 | Morat | 241—117 |
| 2,774,734 | 12/1956 | Rodis | 252—60 |

OTHER REFERENCES

Taggart: Handbook of Mineral Dressing, John Wiley & Sons, New York, N.Y., 1945.

FRANK W. LUTTER, *Primary Examiner.*